(12) United States Patent
Taylor et al.

(10) Patent No.: US 8,648,127 B2
(45) Date of Patent: Feb. 11, 2014

(54) SELF DECONTAMINATING CHEMICAL AND BIOLOGICAL AGENT RESISTANT COATING

(75) Inventors: Lynn G. Taylor, Mesa, AZ (US); Nancy W. Carlson, Chandler, AZ (US); Adam F. Gross, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 452 days.

(21) Appl. No.: 12/131,808

(22) Filed: Jun. 2, 2008

(65) Prior Publication Data

US 2009/0298967 A1    Dec. 3, 2009

(51) Int. Cl.
  C08K 3/10    (2006.01)
  C08K 3/18    (2006.01)
  C08K 3/28    (2006.01)
  C08K 3/40    (2006.01)
  C08K 5/16    (2006.01)
  C08G 18/08   (2006.01)
  C08L 75/04   (2006.01)

(52) U.S. Cl.
  USPC ........... 523/122; 435/180; 524/186; 524/403; 524/428; 524/432; 524/494; 524/589

(58) Field of Classification Search
  USPC ........... 523/122; 435/180; 524/186, 403, 432, 524/428, 494, 589
  See application file for complete search history.

(56) References Cited

U.S. PATENT DOCUMENTS

| | | | |
|---|---|---|---|
| 4,011,130 A * | 3/1977 | Worden | 162/151 |
| 4,304,706 A | 12/1981 | Urs | |
| 5,064,613 A | 11/1991 | Higgs et al. | |
| 5,359,104 A | 10/1994 | Higgs et al. | |
| 5,691,410 A | 11/1997 | Escarsega et al. | |
| 5,753,250 A | 5/1998 | Hagiwara | |
| 5,827,524 A | 10/1998 | Hagiwara et al. | |
| 6,294,185 B1 | 9/2001 | Worley et al. | |
| 6,469,177 B1 | 10/2002 | Worley et al. | |
| 6,969,769 B2 | 11/2005 | Worley et al. | |
| 7,794,796 B2 * | 9/2010 | Feng et al. | 427/412 |
| 2004/0109853 A1 * | 6/2004 | McDaniel | 424/94.6 |
| 2004/0175407 A1 | 9/2004 | McDaniel | |
| 2006/0141003 A1 | 6/2006 | McDaniel | |
| 2006/0156948 A1 | 7/2006 | Hendriks et al. | |
| 2006/0217515 A1 | 9/2006 | Getman et al. | |
| 2007/0014754 A1 | 1/2007 | Denkewicz, Jr. et al. | |
| 2007/0048358 A1 | 3/2007 | Schorr et al. | |
| 2007/0062884 A1 * | 3/2007 | Sun et al. | 210/764 |
| 2007/0071713 A1 | 3/2007 | Mahmud et al. | |
| 2007/0086976 A1 | 4/2007 | Sun et al. | |
| 2007/0224161 A1 | 9/2007 | Sun et al. | |
| 2008/0124368 A1 | 5/2008 | Sarangapani | |
| 2010/0239679 A1 * | 9/2010 | Greene et al. | 424/490 |

FOREIGN PATENT DOCUMENTS

| EP | 1475414 A | 11/2004 |
|---|---|---|
| WO | WO2007044784 A | 4/2007 |

OTHER PUBLICATIONS

Duncan, J.L. et al., "Water-Dispersible Polyurethane Coatings for the Department of Defense", pub. Metal Finishing, Elsevier, NY, NY, US Jul. 1, 2001 pp. 31, 33-41.
Prokop, Zbynek, et al, "Enzymes fight chemical weapons," Biotechnol. J. 2006;1;1370-1380.
Harvey, Steven P., "Enzymatic Degradataion of HD," ERDEC-TR-220, U.S. Army Edgewood Chemical Biological Center; U.S. Army Soldier and Biological Chemical command; Aberdeen Proving Ground, Dec. 2001, Unclassified report.

* cited by examiner

Primary Examiner — Kriellion Sanders

(57) ABSTRACT

The disclosure provides for a self decontaminating coating and method. The coating comprises a polyurethane component having a solids content in the range of about 10 weight percent to about 100 weight percent and having at least one volume percent free space, a chemical active, and a biological active. In another disclosed embodiment, a method of reducing the transportation of chemical contaminants and biological contaminants is provided comprising the steps of providing a self decontaminating coating comprising a polyurethane component having a polyurethane component having a solids content in the range of about 10 weight percent to about 100 weight percent and having at least one volume percent free space, a chemical active, and a biological active, and applying the coating to a surface of an aircraft, rotorcraft, vehicle, item of equipment, or architectural structure.

33 Claims, 1 Drawing Sheet

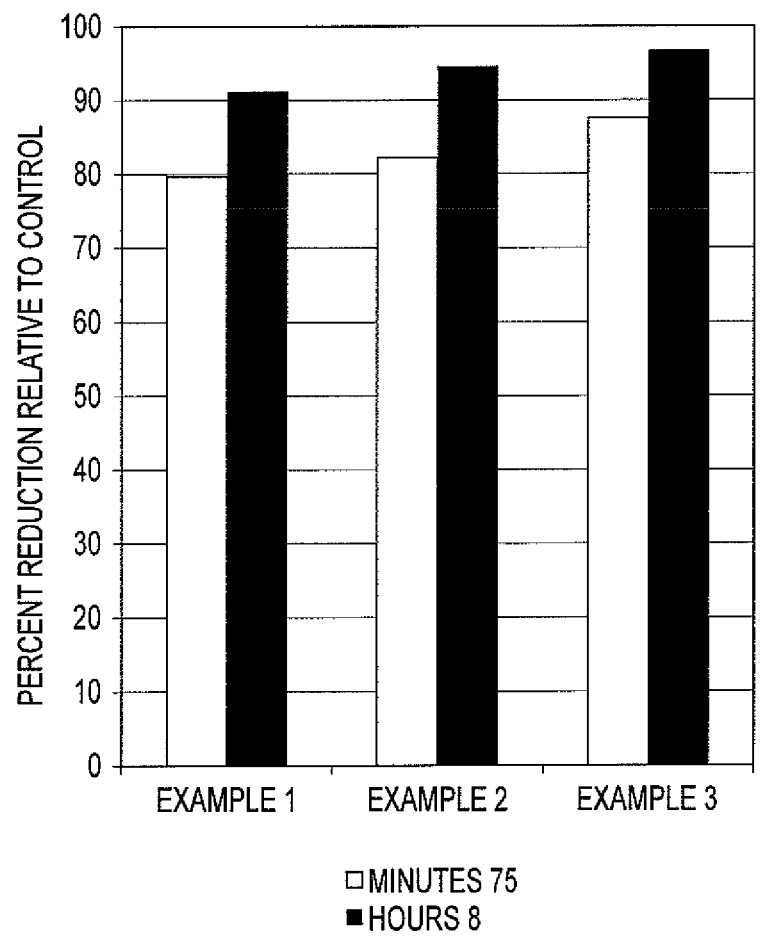

SELF DECONTAMINATING CHEMICAL AND BIOLOGICAL AGENT RESISTANT COATING

BACKGROUND OF THE DISCLOSURE

1) Field of the Disclosure

The disclosure relates to coatings and paints. More particularly, the disclosure relates to a self decontaminating chemical and biological agent resistant coating and method.

2) Description of Related Art

Known paints and coatings that are resistant to various chemical or biological agents may be used on aircraft, rotorcraft, vehicles, items of equipment, architectural structures, or other various structures. For example, a solvent borne chemical agent resistant coating is disclosed in U.S. Pat. No. 4,304,706, and a water dispersible chemical agent resistant coating is disclosed in U.S. Pat. No. 5,691,410. However, these patents, as well as other known paints and coatings, do not disclose paints or coatings that are self decontaminating. Known chemical agent resistant coatings typically require application of caustic oxidizing solutions to remove any chemical or biological agents or contaminants. Such caustic oxidizing solutions, such as DS2 (Decontamination Solution Number 2), which comprises 70% diethylenetriamine, 28% ethylene glycol monomethyl ether, and 2% sodium hydroxide, can cause damage to the aircraft, rotorcraft, vehicle, or equipment to which it is applied. Moreover, having to transport such additional caustic oxidizing solutions to the location of the contaminated aircraft, rotorcraft, vehicle, or equipment can be expensive and time consuming. In addition, having to apply such additional caustic oxidizing solutions can be time consuming and labor intensive, and the down time of the aircraft, rotorcraft, vehicle, or equipment can be increased.

Known paints and coatings also exist that include chemical or anti-chemical actives, or biological or antibacterial/antimicrobial actives. Such paints and coatings may also be used on aircraft, rotorcraft, vehicles, or equipment. For such paints or coatings to maintain their anti-chemical or antibacterial/antimicrobial actives, they must be able to withstand severe wear-intensive environments. Typically, such actives are applied as coatings on top of a paint system used on aircraft, rotorcraft, vehicles, or equipment, and such surface application may make the actives vulnerable to environmental damage. The ability of the paints or coatings to maintain their anti-chemical or antibacterial/antimicrobial actives may be diminished if the paint or coating is damaged, scraped, or scratched during operation of the aircraft, rotorcraft, vehicle, or equipment, because such actives are typically applied at the surface of the paint or coating. When an aircraft, rotorcraft, vehicle, or equipment has a surface irregularity, such as a scraped or scratched surface, the continuity of the paint or coating may be broken, the anti-chemical or antibacterial actives may be lost or removed, and the chemical or biological agent resistance may be diminished. Known methods of repairing the surface irregularities of the aircraft, rotorcraft, vehicle, or equipment may include using known aerosol touch-up paints on the surface. However, such known aerosol touch-up paints do not provide any chemical or biological agent resistance to the sprayed areas. Moreover, such known paints and coatings are not self decontaminating and do not combine both anti-chemical and/or antibacterial/antimicrobial actives in a single coating. In addition, the efficacy of the anti-chemical and antibacterial/antimicrobial actives in such known paints or coatings typically does not last for the life of the paints or coatings.

Accordingly, there is a need for a self decontaminating chemical and biological agent resistant coating and method that have advantages over known coatings and methods.

SUMMARY OF THE DISCLOSURE

This need for a self decontaminating chemical and biological agent resistant coating and method that have advantages over known coatings and methods, as well as a unique, non-obvious, and advantageous coating and method, is satisfied. None of the known coatings and methods provides all of the numerous advantages discussed herein. Unlike known coatings and methods, embodiments of the self decontaminating chemical and/or biological agent resistant coating and method have one or more of the following advantages: provides a self decontaminating chemical and/or biological agent resistant coating or paint that decontaminates itself and does not require the use of costly known decontamination solutions, such as caustic oxidizing solutions, which can be time consuming to apply, and does not require human handling of decontamination solutions; provides a self decontaminating chemical and/or biological agent resistant coating or paint that mitigates or eliminates exposure to chemical and/or biological agents or toxins by decontaminating itself, provides a self decontaminating chemical and/or biological agent resistant coating and method that can contain chemical or anti-chemical actives, biological or antibacterial/antimicrobial actives, or both chemical and biological actives in a single coating, and that may be used in either solvent borne or water borne forms; provides a self decontaminating chemical and/or biological agent resistant coating and method that allow for removal of chemical and/or biological agents or contaminants immediately after exposure without any external input or delay; provides a self decontaminating chemical and/or biological agent resistant coating and method that are faster to apply and less expensive than known systems and coatings; provides a self decontaminating chemical and/or biological agent resistant coating and method that include chemical or anti-chemical and/or biological or antibacterial/antimicrobial actives dispersed throughout the coating and that remain in the coating throughout the life of the coating and that remain efficacious during the life of the coating; provides a self decontaminating chemical and/or biological agent resistant coating and method that survive known decontamination processes; and, provides a self decontaminating chemical and/or biological agent resistant coating and method that protect against numerous types of chemical and/or biological agents that contact the coating surface.

In an embodiment of the disclosure, there is provided a self decontaminating coating comprising: a polyurethane component having a solids content in the range of about 10 weight percent to about 100 weight percent and having at least one volume percent free space; a chemical active; and, a biological active.

In another embodiment of the disclosure, there is provided a self decontaminating coating comprising: a polyurethane component having a solids content in the range of about 10 weight percent to about 100 weight percent and having at least one volume percent free space; and, a biological active.

In another embodiment of the disclosure, there is provided a self decontaminating coating comprising: a polyurethane component having a solids content in the range of about 10 weight percent to about 100 weight percent and having at least one volume percent free space; and, a chemical active.

In another embodiment there is provided a self decontaminating paint comprising: a polyurethane component having a dried porosity in the range of about 10 volume percent to about 60 volume percent; a chemical active; and, a biological active, wherein the paint is self decontaminating of chemical agents and biological agents that contact a surface of the paint.

In another embodiment there is provided a self decontaminating paint comprising: a polyurethane component having a dried porosity in the range of about 10 volume percent to about 60 volume percent; and, a biological active, wherein the paint is self decontaminating of biological agents that contact a surface of the paint.

In another embodiment there is provided a self decontaminating paint comprising: a polyurethane component having a dried porosity in the range of about 10 volume percent to about 60 volume percent; and, a chemical active, wherein the paint is self decontaminating of chemical agents that contact a surface of the paint.

In another embodiment there is provided a method of reducing the transportation of chemical agents and biological agents comprising the steps of: providing a self decontaminating coating comprising a polyurethane component having a solids content in the range of about 10 weight percent to about 100 weight percent and having at least one volume percent free space; a chemical active; and, a biological active; and, applying the coating to a surface of an aircraft, rotorcraft, vehicle, item of equipment, or architectural structure.

In another embodiment there is provided a method of reducing the transportation of chemical agents and biological agents comprising applying a chemical and biological agent resistant paint to a mobile vehicle, wherein the paint comprises, (a) a polyurethane component having a solids content in the range of about 10 weight percent to about 100 weight percent and having at least one volume percent free space; (b) a chemical active; and, (c) a biological active, wherein the paint is self decontaminating of the chemical agents and the biological agents that contact a surface of the paint.

In another embodiment there is provided a method of reducing the transportation of biological agents comprising applying a biological agent resistant paint to a mobile vehicle, wherein the paint comprises, (a) a polyurethane component having a solids content in the range of about 10 weight percent to about 100 weight percent and having at least one volume percent free space; and, (b) a biological active, wherein the paint is self decontaminating of the biological agents that contact a surface of the paint.

In another embodiment there is provided a method of reducing the transportation of chemical agents comprising applying a chemical agent resistant paint to a mobile vehicle, wherein the paint comprises, (a) a polyurethane component having a solids content in the range of about 10 weight percent to about 100 weight percent and having at least one volume percent free space; and, (b) a chemical active, wherein the paint is self decontaminating of the chemical agents that contact a surface of the paint.

BRIEF DESCRIPTION OF THE DRAWINGS

The foregoing and other advantages and features, and the manner in which the same are accomplished, will become more readily apparent upon consideration of the following detailed description taken in conjunction with the accompanying drawing wherein:

FIG. 1 is a bar graph showing test results of the self decontaminating coatings of disclosed embodiments used in the Examples discussed herein.

DETAILED DESCRIPTION OF THE DISCLOSURE

Embodiments of the disclosure will now be described more fully hereinafter with reference to the accompanying drawing. Indeed, several different embodiments may be provided and should not be construed as limited to the embodiments set forth herein. Rather, these embodiments are provided so that this disclosure will be thorough and complete and will fully convey the scope of the disclosure to those skilled in the art.

The self decontaminating chemical and/or biological agent resistant coating or paint and method of the disclosure may be used on exterior and interior surfaces of aircraft, rotorcraft, vehicles such as trucks and tanks, items of equipment, architectural structures such as buildings, and various other structures having surfaces to be coated or painted. Interior surfaces may include, but are not limited to, interior air duct surfaces of aircraft, interior cabins of aircraft, and aircraft cargo holds, as well as other interior surfaces of aircraft, rotorcraft, vehicles such as trucks and tanks, items of equipment, architectural structures such as buildings, and various other structures having interior surfaces to be coated or painted. Accordingly, one of ordinary skill in the art will recognize and appreciate that the disclosed coating and method can be used in any number of applications involving surfaces to be coated.

In an embodiment of the disclosure, there is provided a self decontaminating coating or paint comprising a polyurethane component having a solids content in the range of about 10 weight percent to about 100 weight percent. More preferably, the polyurethane component may have a solids content in the range of about 40 weight percent to about 60 weight percent. Unless otherwise specified, all percentages are weight percentages based on the total weight of the coating composition. The coating or paint may be composed of solids, including fillers, pigments, resins and processing additives, polymeric beads, emulsions of hydrophobic solids, anti-settling agents, dispersing agents, adhesion promoters, emulsions, and solvents which evaporate upon drying or cure. The self decontaminating coating of the disclosed embodiments may be a chemical agent resistant coating, a biological agent resistant coating, or both a chemical and biological agent resistant coating. The self decontaminating coating or paint used depends on what type of coating or paint is desired and whether a chemical and/or biological agent resistant coating or paint is desired. Chemical agent resistant paints keep chemical contaminants from sorbing and binding to the surface, and chemical agent resistant polyurethane paints typically have a higher porosity than conventional polyurethane paints. Porosity enables the chemical decontaminating agent to perform as intended. There is an inherent porosity that is typically present in the coating or paint. The porosity of the coating or paint is based on the amount of solids and pigments within the coating or paint. Generally, the higher the solids content, the greater the porosity. With the disclosed embodiments, the polyurethane component preferably has at least one volume percent free space or porosity. More preferably, the disclosed embodiments may have a dried porosity in the range of about 10 volume percent to about 60 volume percent in the coating or paint that allows the chemical and/or biological actives, discussed below, to remain in the coating or paint. Most preferably, the disclosed embodiments have a dried porosity in the range of about 20 volume percent to about 40 volume percent in the coating or paint. A higher percentage porosity is preferred. The porosity level allows for percolation space of the chemical and/or biological actives to move around in the coating or paint, and also allows the chemical and/or biological agents or contaminants to be moved to the respective actives that act against them. It is the porosity that gives the coating or paint its self decontaminating functionality. The solids content and porosity of the coating or paint is also an important factor in the wear resistance of the coating or paint.

The coating or paint of the disclosed embodiments is a fully filled coating or paint, that is, all of the necessary components are already in the coating or paint, and it is not necessary to apply an additional special coating or primer under or over the coating or paint. However, the coating or paint may still be used with conventional primers, such that the paint system comprises the primer and the topcoat, where the topcoat has the chemical and/or biological actives dispersed in the topcoat. The coating or paint of the disclosed embodiments is designed not to impact any of the basic characteristics or properties of any underlying paint, for example, such properties as adhesion, weatherability, fuel resistance, or other properties. The coating or paint of the disclosed embodiments may be applied to an exterior or interior surface of an aircraft, rotorcraft, vehicle, item of equipment, or architectural structure. Interior surfaces may comprise interior air duct surfaces, interior cabin surfaces, interior cargo hold surfaces, or other interior surfaces of aircraft, rotorcraft, vehicle, items of equipment, architectural structures, or other structures with interior surfaces to be coated or painted. Preferably, the self decontaminating coating of the disclosure is a solvent based polyurethane component or paint. However, a water based polyurethane component or paint may also be used. In addition, the self decontaminating coating or paint of the disclosed embodiments may be used with acrylic paints, conventional aircraft and vehicle paints, or other various coatings or paints used with aircraft, rotorcraft, vehicles, items of equipment, architectural structures, or other structures.

The self decontaminating coating may further comprise a chemical active that is dispersed or incorporated into the polyurethane component. The chemical active may comprise N-halamines, organophosphorus hydrolase enzymes, haloalkane dehalogenase enzymes, or other suitable chemical actives. The self decontaminating coating may further comprise a biological active that is dispersed or incorporated into the polyurethane component. The biological active may comprise silane quaternary ammonium compounds, ammonium containing polymers, inorganic silver and zinc ion containing zeolites, inorganic silver and zinc ion containing glasses, N-halamines, or other suitable biological actives. The chemical and/or biological actives are preferably dispersed throughout the polyurethane component or topcoat of the coating or paint rather than just applied on the surface of the coating or paint. Thus, if the coating or paint is damaged, scraped or scratched, there are available underlying layers of actives within the coating or paint to act against the chemical and/or biological agents.

The N-halamines are organic and inorganic compounds in which oxidative halogen is chemically bonded to nitrogen, and they may be used as both chemical actives or anti-chemical actives, and bacterial actives or antibacterial/antimicrobial actives. They stabilize an oxidizing agent and act against chemical and bacterial agents or contaminants. They remain stable over long time periods and may be recharged by exposure to an oxidizer, such as dilute bleach or ozone. The N-halamine molecules may be bonded to a fabric or in a coating. Suitable N-halamines may be obtained from Halo-Source, Inc. of Bothell, Wash.

Enzymes, such as organophosphorus hydrolase enzymes and haloalkane dehalogenase enzymes, or other commercially available enzymes, may be used as chemical actives or anti-chemical actives. Suitable solid or liquid enzymes may be used. Organophosphorus hydrolase enzymes break bonds between phosphorous and other atoms and may be used against VX (O-ethyl-S-[2(diisopropylamino)ethyl]methylphosphonothiolate), Sarin (2(fluoromethylphosphoryl)oxypropane), and Soman (3(fluoromethylphosphoryl)oxy2,2-dimethyl butane), which are all organophosphorous based chemical agents. Haloalkane dehalogenase enzymes break bonds between halogens and other atoms and can be used against such chemical agents as mustard gas. Organophosphorus hydrolase enzymes may be obtained from Genencore of Palo Alto, Calif. Such enzymes are purified from genetically modified bacteria and may be incorporated into a coating or paint as a filler. The enzymes chemically break bonds in chemical agents or bacterial agent cell walls.

Silane quaternary ammonium molecules may be used as bacterial actives or antibacterial/antimicrobial actives. The ammonium functional group acts against bacterial agents or contaminants and the silane functional group chemically binds the molecule inside a chemical agent resistant coating. Silane quaternary ammonium actives that are soluble in alcohols may be obtained from AEGIS Environmental Management, Inc. of Midland, Mich., under the name AEGIS MICROBE SHIELD (AEGIS MICROBE SHIELD is a registered trademark of AEGIS Environmental Management, Inc.). The silane functional group condenses with hydroxy groups in or on a target surface in the presence of moisture to immobilize the antimicrobial, and the ammonium functional group acts against bacterial agents or contaminants. The silane is used to bind the silane quaternary ammonium inside a chemical agent resistant coating. A suitable water-soluble quaternary ammonium silane may be obtained from NBS Technology LLC of Locust Valley, N.Y., under the name GOLDSHIELD (GOLDSHIELD is a registered trademark of NBS Technology LLC). The silane binds in or on target surfaces and the ammonium group acts against bacterial agents or contaminants. A similar embodiment of silane quaternary ammonium molecular material includes antibacterial polymers that contain ammonium groups attached to the polymer chain. The ammonium groups act against bacterial agents or contaminants and the polymer becomes immobilized in a coating.

The silver and zinc ion containing zeolites and silver and zinc ion containing glasses may be used as bacterial actives or antibacterial/antimicrobial actives. They are released slowly over time in response to moisture and typically last the lifetime of the coating. The coating of the disclosed embodiment allows moisture to liberate silver which acts against bacterial agents or contaminants. The silver and zinc ion containing zeolites and glasses may be used in solvent based or water based coatings or paints. These silver and zinc ion exchange zeolites and glasses release the silver and zinc ions in the presence of moisture to act against bacterial contaminants by interrupting cellular respiration. Silver and zinc ion containing zeolites may be obtained from Agion of Wakefield, Mass. Silver and zinc ion containing glass, such as CIBA® IRGAGUARD® H6000, may be obtained from Ciba of Tarrytown, N.Y.

Each of the above chemical and biological actives may be used separately or together in the coating or paint of the disclosed embodiments. A preferred combination of actives is a combination of the silver ions and the N-halamines. Another preferred combination of actives is a combination of silane quaternary ammonium compounds and N-halamines. The amount of chemical and/or biological actives that may be used in a coating or paint of the disclosed embodiments may be in the range of about 2 percent by weight of solution to about 5 percent by weight of solution for each active. However, other suitable amounts of chemical and/or biological actives may also be used. The actives are preferably dispersed throughout the polyurethane component or topcoat of the coating or paint. Additionally, the actives may be used in either solvent borne or water borne coatings or paints. The self decontaminating feature of the disclosed embodiments allows the coatings or paints to begin removing chemical and/or biological agents immediately after exposure without an external input. The disclosed embodiments provide a self decontaminating coating or paint system that protects against chemical and/or biological agents using chemical and/or biological actives present in the coating and do not require application of an external decontamination material. In addition, the chemical and/or biological actives remain in the coatings or paints throughout the life of the coatings or paints and remain efficacious and wear resistant during the life of the coatings or paints.

In another embodiment of the disclosure, there is provided a self decontaminating paint comprising a polyurethane component having a dried porosity in the range of about 10 percent to about 60 percent and having at least one volume percent free space, a chemical active, and a biological active, where the paint is self decontaminating of chemical agents and biological agents that contact a surface of the paint. The chemical active may comprise N-halamines, organophosphorus hydrolase enzymes, haloalkane dehalogenase enzymes, or other suitable chemical actives. The biological active may comprise silane quaternary ammonium compounds, ammonium containing polymers, inorganic silver and zinc ion containing zeolites, inorganic silver and zinc ion containing glasses, N-halamines, or other suitable biological actives. Preferably, the coating is applied to a surface of an aircraft, rotorcraft, vehicle, item of equipment, or architectural structure. The self decontaminating paint or coating may comprise both chemical and biological actives, only biological actives, or only chemical actives.

In an embodiment of the disclosure, there is provided a method of reducing the transportation of chemical contaminants and biological contaminants. The method comprises the step of providing a self decontaminating coating comprising a polyurethane component having a solids content in the range of about 10 weight percent to about 100 weight percent and having at least one volume percent free space, a chemical active, and a biological active. The method further comprises the step of applying the coating to an exterior and/or interior surface of an aircraft, rotorcraft, vehicle, item of equipment, or architectural structure. Interior surfaces may comprise interior air duct surfaces, interior cabin surfaces, interior cargo hold surfaces, or other interior surfaces of aircraft, rotorcraft, vehicle, items of equipment, architectural structures, or other structures with interior surfaces to be coated or painted. The chemical active may comprise N-halamines, organophosphorus hydrolase enzymes, haloalkane dehalogenase enzymes, or other suitable chemical actives. The biological active may comprise silane quaternary ammonium compounds, ammonium containing polymers, inorganic silver and zinc ion containing zeolites, inorganic silver and zinc ion containing glasses, N-halamines, or other suitable biological actives. Alternatively, the coating or paint may be a self decontaminating chemical agent resistant coating with only chemical actives, or the coating or paint may be a self decontaminating biological agent resistant coating with only biological actives. It should be noted that the particulars relating to the disclosed embodiment, as described above, apply with equal force to the particulars of this disclosed embodiment.

In another embodiment of the disclosure, there is provided a method of reducing the transportation of chemical agents and biological agents. The method comprises applying a chemical and biological agent resistant paint to a mobile vehicle, wherein the paint comprises, (a) a polyurethane component having a solids content in the range of about 10 weight percent to about 100 weight percent and having at least one volume percent free space; (b) a chemical active; and, (c) a biological active. The paint is self decontaminating of the chemical agents and the biological agents that contact a surface of the paint. The chemical active may comprise N-halamines, organophosphorus hydrolase enzymes, haloalkane dehalogenase enzymes, or other suitable chemical actives. The biological active may comprise silane quaternary ammonium compounds, ammonium containing polymers, inorganic silver and zinc ion containing zeolites, inorganic silver and zinc ion containing glasses, N-halamines, or other suitable biological actives. Alternatively, the coating or paint may be a self decontaminating chemical agent resistant coating with only chemical actives, or the coating or paint may be a self decontaminating biological agent resistant coating with only biological actives. It should be noted that the particulars relating to the disclosed embodiment, as described above, apply with equal force to the particulars of this disclosed embodiment.

In the below Examples and accompanying Figure chemical and biological actives were tested in chemical agent resistant coating formulations and tested for stability prior to application and uniformity upon application. In Examples 1-3 discussed below, the coatings were tested against *E. coli* ATCC 11229 bacteria to screen for efficacy on vegetative bacteria. For example, AEGIS® AEM 5772 silane quaternary ammonium actives were integrated into the chemical agent resistant coating. The silane functional group condenses with polyurethane in the chemical agent resistant coating making the active immobile and the ammonium functional group acts against bacteria. Active levels up to 2 wt % were used on the basis of solids in the coating. These active levels translate up to 1.32 wt % based on the total mass of the liquid chemical agent resistant coating. CIBA® IRGAGUARD® H6000, an ion-exchange glass containing silver and zinc ions that can be integrated into the chemical agent resistant coating as a filler, was also used. These ions are released in the presence of moisture and act against bacteria by interrupting cellular respiration. Active levels of 2.5 wt % to 5 wt % were used on the basis of solids in the coating (up to 3.30 wt % based on the total mass of the liquid chemical agent resistant coating). These actives were formulated into coatings singularly and in combination with one another. Coatings containing these antimicrobials were tested against *E. coli* ATCC 11229 bacteria to screen for efficacy. All testing was performed according to standard microbiological practices, and bacteria were sprayed onto paint panels instead of being fogged in a closed chamber. Formulations containing quaternary silane ammonium and silver ion actives were tested against *E. coli*.

FIG. 1 is a bar graph showing test results of the self decontaminating coatings of disclosed embodiments used in the Examples discussed below. The bar graph of FIG. 1 shows the percent reduction of *E. coli* bacteria over 75 minutes and over 8 hours using the coatings set forth in the below Examples.

EXAMPLES

Example 1

147.5 g of 37038 aircraft black ZENTHANE® MIL-DTL-53039B (Type 1) was mixed with 5.30 g of CIBA® IRGAGUARD® H6000 silver and zinc ion containing glass for 20 minutes until the suspension was smooth. This formulation was sprayed onto aluminum panels primed with MIL-PRF-85582 epoxy based primer. The painted panels were allowed to dry for two days and then tested for bacterial reduction against *E. coli* ATCC 11229 as a surrogate for general, vegetative, bacterial pathogens. The panels were tested by the following steps: (1) Culture, purify, and titer E. coli stock; (2) Apply approximately 1.times.10.sup.7 cfu/m2 E. coli to CIBA® IRGAGUARD® H6000 containing painted coupons and to unaltered control coupons of chemical agent resistant coating by spraying evenly; (3) Incubate at 30.degree. C. (Celsius) for 75 minutes and for 8 hours; (4) Elute any surviving E. coli from the surface and neutralize any active in solution; (5) Enumerate elutant using standard techniques; (6) Calculate log reductions relative to control surface. It was found the population of E. coli was 79.8% less (4.15E3 colony forming units (cfu) versus 2.05E4 cfu) on the painted panels containing antimicrobial actives after 75 minutes of exposure to the panels. After 8 hours of exposure to the panels the population of E. coli was 91.2% less (3.50E2 cfu versus 3.98E3 cfu) on the painted panels containing antimicrobial actives as compared to the unaltered control chemical agent resistant coating panels.

Example 2

147.5 g of 37038 aircraft black ZENTHANE® MIL-DTL-53039B (Type 1) was mixed with 2.88 g of AEGIS® AEM 5772 quaternary ammonium silane for 20minutes until the suspension was smooth. This formulation was sprayed onto aluminum panels primed with MIL-PRF-85582 epoxy based primer. The painted panels were allowed to dry for two days and then tested for bacterial reduction against E. coli ATCC 11229 as a surrogate for general, vegetative, bacterial pathogens. The panels were tested by the following steps: (1) Culture, purify, and titer E. coli stock; (2) Apply approximately 1.times.10.sup.7 cfu/m2 E. coli to CIBA® IRGAGUARD® H6000 containing painted coupons and to unaltered control coupons of chemical agent resistant coating by spraying evenly; (3) Incubate at 30.degree. C. for 75minutes and for 8 hours; (4) Elute any surviving E. coli from surface and neutralize any active in solution; (5) Enumerate elutant using standard techniques; (6) Calculate log reductions relative to control surface. It was found the population of E. coli was 82.2% less (3.65E3 cfu versus 2.05E4 cfu) on the painted panels containing antimicrobial actives after 75 minutes of exposure to the panels. After 8 hours of exposure to the panels the population of E. coli was 94.6% less (2.15E2cfu versus 3.98E3 cfu) on the painted panels containing antimicrobial actives as compared to the unaltered control chemical agent resistant coating panels.

Example 3

147.5 g of 37038 aircraft black ZENTHANE® MIL-DTL-53039B (Type 1) was mixed with 2.66 g of CIBA® IRGAGUARD® H6000 silver and zinc ion containing glass and 2.95 g of AEGIS® AEM 5772 quaternary ammonium silane for 20 minutes until the suspension was smooth. This formulation was sprayed onto aluminum panels primed with MIL-PRF-85582 epoxy based primer. The painted panels were allowed to dry for two days and then tested for bacterial reduction against E. coli ATCC 11229 as a surrogate for general, vegetative, bacterial pathogens. The panels were tested by the following steps: (1) Culture, purify, and titer E. coli stock; (2) Apply approximately 1.times.10.sup.7 cfu/m2 E. coli to CIBA® IRGAGUARD® H6000 containing painted coupons and to unaltered control coupons of chemical agent resistant coating by spraying evenly; (3) Incubate at 30.degree. C. for 75 minutes and for 8 hours; (4) Elute any surviving E. coli from surface and neutralize any active in solution; (5) Enumerate elutant using standard techniques; (6) Calculate log reductions relative to control surface. It was found the population of E. coli was 87.6% less (2.55E3 cfu versus 2.05E4cfu) on the painted panels containing antimicrobial actives after 75 minutes of exposure to the panels. After 8 hours of exposure to the panels the population of E. coli was 96.7% less (1.30E2cfu versus 3.98E3 cfu) on the painted panels containing antimicrobial actives as compared to the unaltered control chemical agent resistant coating panels.

Evaluation

Coatings with higher levels of biological actives or antibacterial actives showed up to a 97% reduction in E. coli. Silver zeolite antimicrobials and silane quarternary ammonium antimicrobials were successful against vegetative bacteria when incorporated into solvent based chemical agent resistant coatings.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A self decontaminating solvent based coating comprising:
    a solvent based polyurethane component having a dried porosity in a range of about 10 volume percent to about 60 volume percent;
    a chemical active incorporated into the solvent based polyurethane component, the chemical active selected from the group consisting of N-halamines, organophosphorus hydrolase enzymes, and haloalkane dehalogenase enzymes; and,
    a biological active incorporated into the solvent based polyurethane component, the biological active selected from the group consisting of silane quaternary ammonium compounds, ammonium containing polymers, inorganic silver and zinc ion containing zeolites, and inorganic silver and zinc ion containing glasses,
    wherein the dried porosity allows for percolation space of a chemical agent to move in the coating to the chemical active that acts against the chemical agent, and allows for a biological agent to move in the coating to the biological active that acts against the biological agent, such that the chemical and biological actives remove without use of an external decontamination material the respective chemical and biological agents after exposure of the coating to the respective chemical and biological agents, and further wherein the chemical active and the biological active are dispersed throughout the solvent based polyurethane component of the coating.

2. The self decontaminating solvent based coating of claim 1, wherein the chemical active is N-halamines.

3. The self decontaminating solvent based coating of claim 1, wherein the biological active is silane quaternary ammonium compounds.

4. The self decontaminating solvent based coating of claim 1, wherein the solvent based polyurethane component has a solids content in the range of about 40 weight percent to about 60 weight percent.

5. The self decontaminating solvent based coating of claim 1, wherein the coating is applied to an exterior surface of an aircraft, rotorcraft, vehicle, item of equipment, or architectural structure.

6. The self decontaminating solvent based coating of claim 1, wherein the coating is applied to an interior surface of an aircraft, rotorcraft, vehicle, item of equipment, or architectural structure.

7. The self decontaminating solvent based coating of claim 1, wherein the chemical active and the biological active are dispersed throughout the coating and remain in the coating throughout the life of the coating.

8. The self decontaminating solvent based coating of claim 1, wherein the chemical active and the biological active are each present in an amount in a range of about 2 weight percent to about 5 weight percent.

9. The self decontaminating solvent based coating of claim 1, wherein the solvent based polyurethane component has a dried porosity in the range of from about 20 volume percent to about 40 volume percent.

10. A self decontaminating solvent based coating comprising:
a solvent based polyurethane component having a dried porosity in a range of about 10 volume percent to about 60 volume percent; and,
a biological active incorporated into the solvent based polyurethane component, the biological active is selected from the group consisting of silane quaternary ammonium compounds, ammonium containing polymers, inorganic silver and zinc ion containing zeolites, and inorganic silver and zinc ion containing glasses,
wherein the porosity allows for percolation space of a biological agent to move in the coating to the biological active that acts against the biological agent, such that the biological active removes without use of an external decontamination material the biological agent after exposure of the coating to the biological agent, and further wherein the biological active is dispersed throughout the solvent based polyurethane component of the coating.

11. The self decontaminating solvent based coating of claim 10, wherein the biological active is silane quaternary ammonium compounds.

12. A self decontaminating solvent based coating comprising:
a solvent based polyurethane component having a dried porosity in a range of about 10 volume percent to about 60 volume percent; and,
a chemical active incorporated into the solvent based polyurethane component, the chemical active is selected from the group consisting of N-halamines, organophosphorus hydrolase enzymes, and haloalkane dehalogenase enzymes,
wherein the porosity allows for percolation space of a chemical agent to move in the coating to the chemical active that acts against the chemical agent, such that the chemical active removes without use of an external decontamination material the chemical agent after exposure of the coating to the chemical agent, and further wherein the chemical active is dispersed throughout the solvent based polyurethane component of the coating.

13. The self decontaminating solvent based coating of claim 12, wherein the chemical active is N-halamines.

14. A self decontaminating solvent based paint comprising:
a solvent based polyurethane component having a dried porosity in a range of about 10 volume percent to about 60 volume percent;
a chemical active incorporated into the solvent based polyurethane component, the chemical active is selected from the group consisting of N-halamines, organophosphorus hydrolase enzymes, and haloalkane dehalogenase enzymes; and,
a biological active incorporated into the solvent based polyurethane component, the biological active is selected from the group consisting of silane quaternary ammonium compounds, ammonium containing polymers, inorganic silver and zinc ion containing zeolites, and inorganic silver and zinc ion containing glasses,
wherein the porosity allows for percolation space of a chemical agent to move in the paint to the chemical active that acts against the chemical agent, and allows for a biological agent to move in the paint to the biological active that acts against the biological agent, and further wherein the paint is self decontaminating of the chemical agents and the biological agents that contact a surface of the paint, such that the chemical and biological actives remove without use of an external decontamination material the respective chemical and biological agents after exposure of the paint to the respective chemical and biological agents, and further wherein the chemical active and the biological active are dispersed throughout the solvent based polyurethane component of the paint.

15. The paint of claim 14, wherein the chemical active is N-halamines halamines.

16. The paint of claim 14, wherein the biological active is silane quaternary ammonium compounds.

17. The paint of claim 14 wherein the polyurethane component has a solids content in the range of about 40 weight percent to about 60 weight percent.

18. A self decontaminating solvent based paint comprising:
a solvent based polyurethane component having a dried porosity in a range of about 10 volume percent to about 60 volume percent; and,
a biological active incorporated into the solvent based polyurethane component, the biological active is selected from the group consisting of silane quaternary ammonium compounds, ammonium containing polymers, inorganic silver and zinc ion containing zeolites, and inorganic silver and zinc ion containing glasses,
wherein the porosity allows for percolation space of a biological agent to move in the paint to the biological active that acts against the biological agent, and further wherein the paint is self decontaminating of the biological agents that contact a surface of the paint, such that the biological active removes without use of an external decontamination material the biological agent after exposure of the paint to the biological agent, and further wherein the biological active is dispersed throughout the solvent based polyurethane component of the paint.

19. The paint of claim 18, wherein the biological active is silane quaternary ammonium compounds.

20. A self decontaminating solvent based paint comprising:
a solvent based polyurethane component having a dried porosity in a range of about 10 volume percent to about 60 volume percent; and,
a chemical active incorporated into the solvent based polyurethane component, the chemical active is selected from the group consisting of N-halamines, organophosphorus hydrolase enzymes, and haloalkane dehalogenase enzymes,
wherein the porosity allows for percolation space of a chemical agent to move in the paint to the chemical active that acts against the chemical agent, and further wherein the paint is self decontaminating of the chemical agents that contact a surface of the paint, such that the chemical active removes without use of an external decontamination material the chemical agent after exposure of the paint to the chemical agent, and further wherein the chemical active is dispersed throughout the solvent based polyurethane component of the paint.

21. The paint of claim 20, wherein the chemical active is N-halamines.

22. A method of reducing the transportation of chemical agents and biological agents comprising the steps of:
providing a self decontaminating solvent based coating comprising a solvent based polyurethane component having a dried porosity in a range of from about 10 volume percent to about 60 volume percent;
a chemical active incorporated into the solvent based polyurethane component, the chemical active is selected from the group consisting of N-halamines, organophosphorus hydrolase enzymes, and haloalkane dehalogenase enzymes; and,
a biological active incorporated into the solvent based polyurethane component, the biological active is selected from the group consisting of silane quaternary ammonium compounds, ammonium containing polymers, inorganic silver and zinc ion containing zeolites, and inorganic silver and zinc ion containing glasses,
wherein the porosity allows for percolation space of a chemical agent to move in the coating to the chemical active that acts against the chemical agent, and allows for a biological agent to move in the coating to the biological active that acts against the biological agent, and such that the chemical and biological actives remove without use of an external decontamination material the respective chemical and biological agents after exposure of the coating to the respective chemical and biological agents, and further wherein the chemical active and biological active are dispersed throughout the solvent based polyurethane component of the coating; and,
applying the coating to a surface of an aircraft, rotorcraft, vehicle, item of equipment, or architectural structure.

23. The method of claim 22, wherein the coating is applied to an exterior surface of an aircraft, rotorcraft, vehicle, item of equipment, or architectural structure.

24. The method of claim 22, wherein the coating is applied to an interior surface of an aircraft, rotorcraft, vehicle, item of equipment, or architectural structure, and further wherein the interior surface is selected from the group comprising interior air duct surfaces, interior cabin surfaces, and interior cargo hold surfaces.

25. The method of claim 22, wherein the chemical active is N-halamines.

26. The method of claim 22, wherein the biological active is silane quaternary ammonium compounds.

27. A method of reducing the transportation of chemical agents and biological agents comprising applying a chemical and biological agent resistant solvent based paint to a mobile vehicle, wherein the paint comprises,
(a) a solvent based polyurethane component having a solids content in a range of about 40 weight percent to about 60 weight percent and having a dried porosity in a range of from about 10 volume percent to about 60 volume percent;
(b) a chemical active incorporated into the solvent based polyurethane component, the chemical active is selected from the group consisting of N-halamines, organophosphorus hydrolase enzymes, and haloalkane dehalogenase enzymes; and,
(c) a biological active incorporated into the solvent based polyurethane component, the biological active is selected from the group consisting of silane quaternary ammonium compounds, ammonium containing polymers, inorganic silver and zinc ion containing zeolites, and inorganic silver and zinc ion containing glasses,
wherein the porosity allows for percolation space of a chemical agent to move in the paint to the chemical active that acts against the chemical agent, and allows for a biological agent to move in the paint to the biological active that acts against the biological agent, and further wherein the paint is self decontaminating of the chemical agents and the biological agents that contact a surface of the paint, such that the chemical and biological actives remove without use of an external decontamination material the respective chemical and biological agents after exposure of the paint to the respective chemical and biological agents, and further wherein the chemical active and biological active are dispersed throughout the solvent based polyurethane component of the paint.

28. The method of claim 27, wherein the chemical active is N-halamines.

29. The method of claim 27, wherein the biological active is silane quaternary ammonium compounds.

30. A method of reducing the transportation of biological agents comprising applying a biological agent resistant solvent based paint to a mobile vehicle, wherein the paint comprises,
(a) a solvent based polyurethane component having a dried porosity in a range of from about 10 volume percent to about 60 volume percent; and,
(b) a biological active incorporated into the solvent based polyurethane component, the biological active is selected from the group consisting of silane quaternary ammonium compounds, ammonium containing polymers, inorganic silver and zinc ion containing zeolites, and inorganic silver and zinc ion containing glasses,
wherein the porosity allows for percolation space of a biological agent to move in the paint to the biological active that acts against the biological agent, and further wherein the paint is self decontaminating of the biological agents that contact a surface of the paint, such that the biological active removes without use of an external decontamination material the biological agent after exposure of the paint to the biological agent, and further wherein the biological active is dispersed throughout the solvent based polyurethane component of the paint.

31. The method of claim 30, wherein the biological active is silane quaternary ammonium compounds.

32. A method of reducing the transportation of chemical agents comprising applying a chemical agent resistant solvent based paint to a mobile vehicle, wherein the paint comprises,
(a) a solvent based polyurethane component having a dried porosity in a range of from about 10 volume percent to about 60 volume percent; and,
(b) a chemical active incorporated into the solvent based polyurethane component, the chemical active selected from the group consisting of N-halamines, organophosphorus enzymes, and haloalkane dehalogenase enzymes,
wherein the porosity allows for percolation space of a chemical agent to move in the paint to the chemical active that acts against the chemical agent, and further wherein the paint is self decontaminating of the chemical agents that contact a surface of the paint, such that the chemical active removes without use of an external decontamination material the chemical agent after exposure of the paint to the chemical agent, and further wherein the chemical active is dispersed throughout the solvent based polyurethane component of the paint.

33. The method of claim 32, wherein the chemical active is N-halamines.

* * * * *